Dec. 19, 1922.

C. L. BRADFORD.
WELL DRILLING TOOL.
FILED OCT. 11, 1921.

1,439,224.

Inventor
C. L. Bradford
by his Attorneys
Baldwin Wight

Patented Dec. 19, 1922.

1,439,224

UNITED STATES PATENT OFFICE.

CHARLES L. BRADFORD, OF SALT LAKE CITY, UTAH.

WELL-DRILLING TOOL.

Application filed October 11, 1921. Serial No. 507,066.

*To all whom it may concern:*

Be it known that I, CHARLES L. BRADFORD, a citizen of the United States, residing at Salt Lake City, in the county of Salt Lake and State of Utah, have invented certain new and useful Improvements in Well-Drilling Tools, of which the following is a specification.

It is customary in well drilling to employ what is called a "string of tools," the several tools or members of the string being connected by screw-threaded joints. These joints are fairly secure but it often happens that the joints break or work loose while the string is in a well and considerable loss of time and labor is involved in recovering the tools and recoupling the series. The primary object of my invention is to provide means whereby the joints are strengthened and prevented from working loose. It is customary to connect the tools or string members by tapered screw-threaded parts fitting correspondingly tapered and threaded sockets in adjacent members.

According to my invention I employ the tapered members and tapered sockets as heretofore, but I add to each tapered member a plain or unthreaded extension which closely fits a socket extending beyond the threaded socket and I also prolong such extension into a recess in the coupling and provide it with a nut which engages the threaded end of the extension. The threads on the extension are disposed in an opposite direction from those on the tapered threaded member so that should the tapered member tend to turn in its socket in one direction it will be prevented from doing so by the nut which is thereby tightened in the recess and holds the parts from movement. I may also employ a set screw which extends through the box or coupling and engages the extension of the threaded member. My improvements are shown in the accompanying drawings, in which, Figure 1 is a sectional view of portions of drilling tools with my improvements applied;

Figure 1:
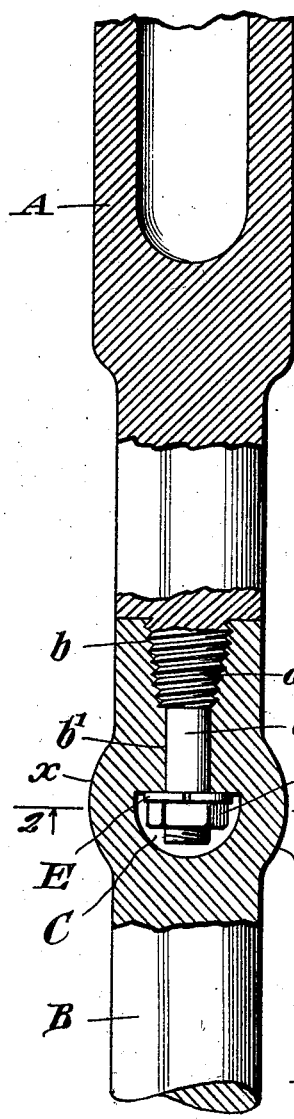
Figure 2:
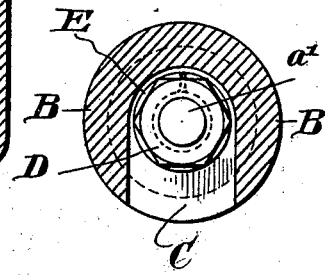
Figure 2 is a transverse section on the line 2—2 of Fig. 1.
Figure 3:
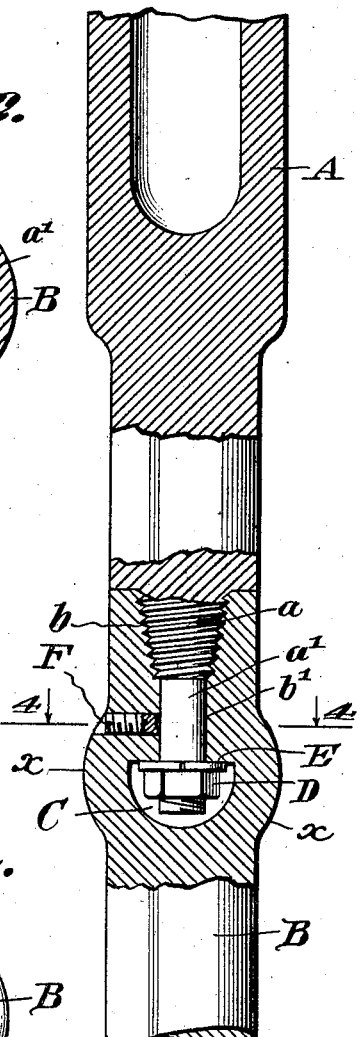
Figure 3 is a view similar to Fig. 1, but showing certain modifications.
Figure 4:
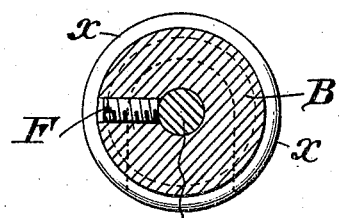
Figure 4 shows a section on the line 4—4 of Fig. 3.

In the drawings I have shown portions of two tools or string members A and B, constructed in accordance with my invention. The tool or string section A is formed with a tapered, threaded member $a$, having a plain or unthreaded extension $a'$. The section B is formed with a tapered socket $b$, which corresponds in size and shape with the member $a$, and is correspondingly threaded. Said member is also formed with a plain socket extension $b'$ to receive the extension $a'$ of the tool A. The extension $a'$ fits accurately the socket $b'$, as shown in the drawings. By this construction strain is taken from the threaded member $a$, and it is prevented from being bent, twisted or moved out of place. The outer end of the extension $a'$ is threaded and extends into a recess C, in the member B, where it engages a nut D, contained in said recess. The threads on the extension $a'$ which receive the nut are disposed in an opposite direction to the threads on the member $a$, so that if the member $a'$ tends to turn, this turning movement will be resisted.

The recess C may extend entirely through the coupling or part-way through, as shown. This opening is preferably formed by punching the member B and swaging it so as to spread its opposite sides as indicated at $x$. In this way the member is strengthened rather than being weakened by forming the recess. It will be observed that all parts are smooth and even at the joints and elsewhere.

The parts may be readily assembled. The nut D may be placed in the recess C and when the members $a$, $a'$ are inserted and driven home, the threaded end of the member $a'$ will engage the nut. Preferably a spring washer E is interposed between the nut and the adjacent wall of the recess. This tends to hold the nut firmly in place.

Figure 5:
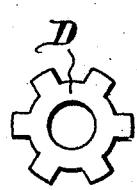
Figure 5 is a detail view of a form of nut that may be employed.

The nut D may be operated by a wrench or other suitable tool and I may employ a nut such as is shown in Figure 5 which is formed with projections by means of which the nut may be turned when a suitable tool is applied.

I may also employ a set screw F of the kind illustrated. This set screw is set into a suitable threaded recess in the member B so as not to project therefrom and its inner end is preferably recessed or cupped as shown to provide edges or an edge which engages the extension $a'$. The set screw may be used in conjunction with the nut D or separately.

I claim as my invention:

1. A coupling for drilling tools comprising a section having a tapered member threaded in one direction and having a plain cylindrical extension terminating in an end threaded in the other direction, a second section having a tapered threaded socket to receive the tapered member, a cylindrical socket in which the cylindrical extension closely fits, and an enlarged socket opening to the outside of the section, and a nut threaded on the threaded end of the extension.

2. A coupling for drilling tools comprising a section having a tapered member threaded in one direction and having a plain cylindrical extension terminating in an end threaded in the other direction, a second section having a tapered threaded socket to receive the tapered member, a cylindrical socket in which the cylindrical extension closely fits, and an enlarged socket opening to the outside of the section, a nut threaded on the threaded end of the extension, and additional means for preventing relative turning or longitudinal movement between the two sections.

In testimony whereof, I have hereunto subscribed my name.

CHARLES L. BRADFORD.